United States Patent
Moon et al.

(10) Patent No.: US 10,139,019 B2
(45) Date of Patent: *Nov. 27, 2018

(54) POLYMER-LINED PIPES AND FITTINGS WITH REPLACEABLE COMPONENTS

(71) Applicant: SYNCRUDE CANADA LTD. in trust for the owners of the Syncrude Project as such owners exist now and in the future, Fort McMurray (CA)

(72) Inventors: Soon Won Moon, Edmonton (CA); Stefano Chiovelli, Edmonton (CA); Shane D. Ryan, Sherwood Park (CA)

(73) Assignee: SYNCRUDE CANADA LTD., Port McMurray (CA), in trust for the owners of the Syncrude Project as such owners exist now and in the future ( * ) Notice: Subject to any disclaimer, the term of this patent is extended or adjusted under 35 U.S.C. 154(b) by 0 days.

This patent is subject to a terminal disclaimer.

(21) Appl. No.: 15/581,939

(22) Filed: Apr. 28, 2017

(65) Prior Publication Data

US 2017/0241574 A1 Aug. 24, 2017

Related U.S. Application Data

(63) Continuation-in-part of application No. 14/860,501, filed on Sep. 21, 2015, now Pat. No. 9,851,025.

(51) Int. Cl.
| F16L 55/00 | (2006.01) |
| F16L 9/133 | (2006.01) |
| F16L 23/00 | (2006.01) |
| F16L 9/128 | (2006.01) |

(52) U.S. Cl.
CPC ............ *F16L 9/133* (2013.01); *F16L 9/128* (2013.01); *F16L 23/003* (2013.01)

(58) Field of Classification Search
CPC .......... F16L 9/133; F16L 9/128; F16L 23/003
USPC ............... 138/36, 97, 146, 155, 98, 109
See application file for complete search history.

(56) References Cited

U.S. PATENT DOCUMENTS

| 1,969,422 | A | * | 8/1934 | Pier | .......................... B01J 19/02 |
| | | | | | 138/146 |
| 2,687,147 | A | * | 8/1954 | Feichter | ................. D01D 4/022 |
| | | | | | 138/44 |
| 3,545,492 | A | * | 12/1970 | Scheid, Jr. | ........ F16L 55/02718 |
| | | | | | 138/42 |
| 3,582,048 | A | * | 6/1971 | Sarem | ................... B01F 5/0644 |
| | | | | | 138/38 |
| 4,234,368 | A | * | 11/1980 | Schwarz | ................. F16L 25/03 |
| | | | | | 138/109 |
| 4,248,716 | A | * | 2/1981 | LaValley | ............. B01D 33/801 |
| | | | | | 210/402 |
| 4,357,745 | A | * | 11/1982 | Chlebowski | ........ F16L 13/0263 |
| | | | | | 138/141 |
| 4,684,155 | A | * | 8/1987 | Davis | ................... B65G 53/523 |
| | | | | | 138/139 |

(Continued)

*Primary Examiner* — James Hook
(74) *Attorney, Agent, or Firm* — Bennett Jones LLP

(57) ABSTRACT

A pipe or fitting having a polymer liner and a replaceable component including an outer ring having an outside diameter matching the inside diameter of the pipe or fitting, a polymer liner bonded to the outer ring and having an inside diameter matching the inside diameter of the liner of the pipe or fitting. The replaceable component is disposed in an inlet or outlet of the pipe or fitting so as to form a continuous bore lined with a polymer.

5 Claims, 16 Drawing Sheets

(56) References Cited

U.S. PATENT DOCUMENTS

| | | | | |
|---|---|---|---|---|
| 4,691,740 | A | * | 9/1987 | Svetlik .................... B29C 49/26 138/104 |
| 4,706,997 | A | * | 11/1987 | Carstensen ........... E21B 17/042 285/13 |
| 4,804,207 | A | * | 2/1989 | Berchem ................. F16L 57/00 138/109 |
| 4,995,427 | A | | 2/1991 | Berchem |
| 5,831,149 | A | * | 11/1998 | Webb .................... F16L 39/005 73/40.5 R |
| 5,988,691 | A | * | 11/1999 | Cruickshank ....... F16L 58/1009 285/288.1 |
| 6,079,095 | A | * | 6/2000 | McMillan ............... F16L 33/28 264/248 |
| 6,148,864 | A | * | 11/2000 | Pascoe ................ B29C 65/7802 138/107 |
| 6,979,025 | B2 | * | 12/2005 | Conder ................ B29C 65/342 285/364 |
| 2001/0029988 | A1 | | 10/2001 | Robison et al. |

\* cited by examiner

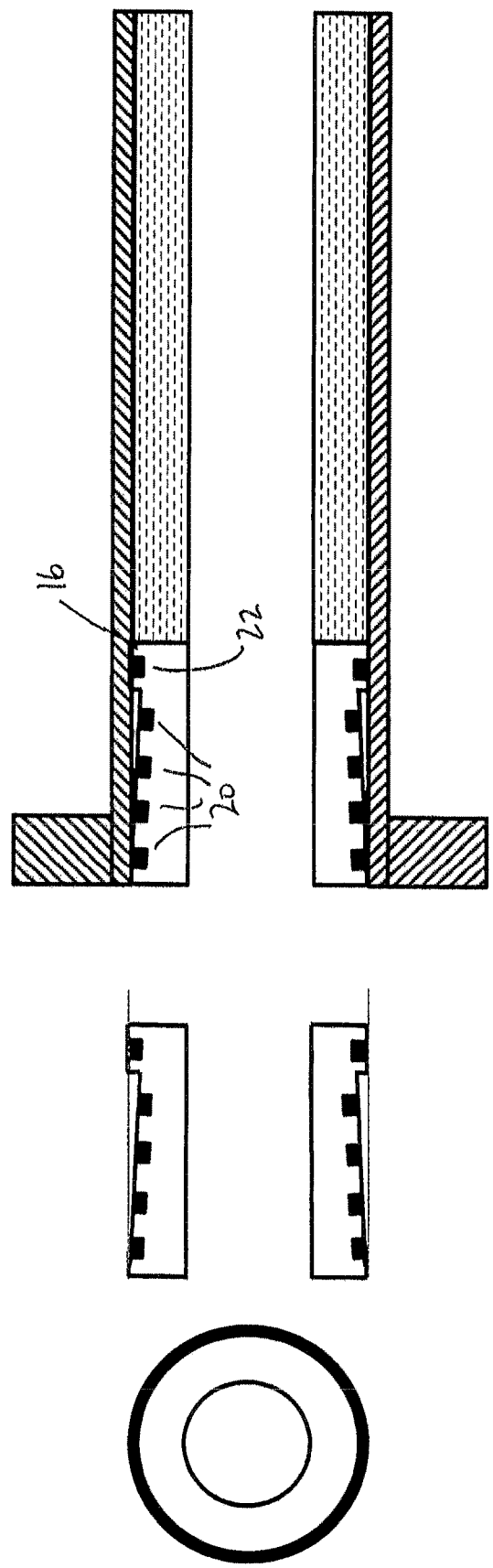

POLYMER-LINED PIPES AND FITTINGS WITH REPLACEABLE COMPONENTS

FIELD OF THE INVENTION

The present invention relates generally to pipes and fittings having a polymer liner, and having replaceable inlet and/or outlet components.

BACKGROUND

Due to superior wear and corrosion resistance, polymer-lined pipes and fittings have been used in many aggressive slurry services in the oil sands mining industry. Rubbers and polyurethanes are the main polymeric liner materials currently being used. Liner thickness is commensurate with length of the pipe run, and can exceed 1 inch in very long pipe runs. However, liner wear still occurs, and in particular, the inlets and outlets often experience the most serious liner wear. This is mainly due to pipe misalignment where the resultant step change in pipe inside diameter (ID) can cause so-called 'liner wash-out' due to either direct impingement from the slurry particles (prior art FIG. 1A) or slurry turbulence. The wash-out area is localized, normally less than a foot from the pipe connection between the upstream pipe (UP) and the downstream pipe (DP). Liner wear is often accelerated in that localized wear zone, resulting in early retirement of the spool even though most areas are in serviceable condition.

When two different piping materials having significantly different wear rates are connected side by side, ID mismatch can develop during pipe operation and this can also lead to accelerated liner wear near the pipe connection. Piping components can have different geometries (i.e. elbows vs. straight spools) having different wear profiles and rotation strategies and in this case, step change in ID can appear after pipe rotation. It is challenging to achieve ID match throughout the pipeline during operation.

Currently, field repair kits are used to address the localized liner wear. Repair kits are composed of two-part mixing components: once they are mixed together and applied onto the damage area, solid repair patch is formed after curing. Proper surface preparation (solvent cleaning, mechanical buffing on the liner adjacent to the damage area), good environmental control (temperature, humidity), and skillsets of the applicators are key to success. Since repairs are conducted in the field during outages where limited time and resources are available, it is challenging to achieve consistent repair quality. Accordingly, there remains a need for more efficient and reliable technologies to achieve smooth ID transition in polymer-lined pipeline.

When there is step-change in inside diameter at pipe connection due to different inside diameters (IDs) of mating pipes (prior art FIG. 1B), transition rings can be used for smooth ID transition. Transition rings use abrasion and wear resistant alloy linings such as tungsten carbide, which introduces significant cost increase. Also, transition rings are flange-connected, thereby incorporating more pipe connection points with a resulting increase in the possibility of ID mismatch.

SUMMARY OF THE INVENTION

In one aspect, the invention may comprise a polymer-lined pipe or fitting having replaceable components, wherein the inlet and/or the outlet of the polymer-lined pipe or fitting is adapted to receive a replaceable component to form a continuous bore. The replaceable component may comprise:
  a. an outer ring having at least a portion with an outside diameter matching an inside diameter of the pipe or fitting; and
  b. a polymer liner bonded to the outer ring and having an inside diameter matching the inside diameter of the polymer liner of the pipe or fitting.

In some embodiments, the outer ring may comprise two or more rings, separated by the polymer liner, or may comprise a spirally wound ring, or may be elongated and tapered to be a portion of a truncated cone, wherein a first end of the outer ring contacts an inside surface of the pipe and a second end does not.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

FIG. 15 shows a longitudinal cross-sectional view of an alternative embodiment, where the outer ring comprises a plurality of narrow rings, gapped with the polymer liner, and an end ring.

DETAILED DESCRIPTION

Figure 1A:
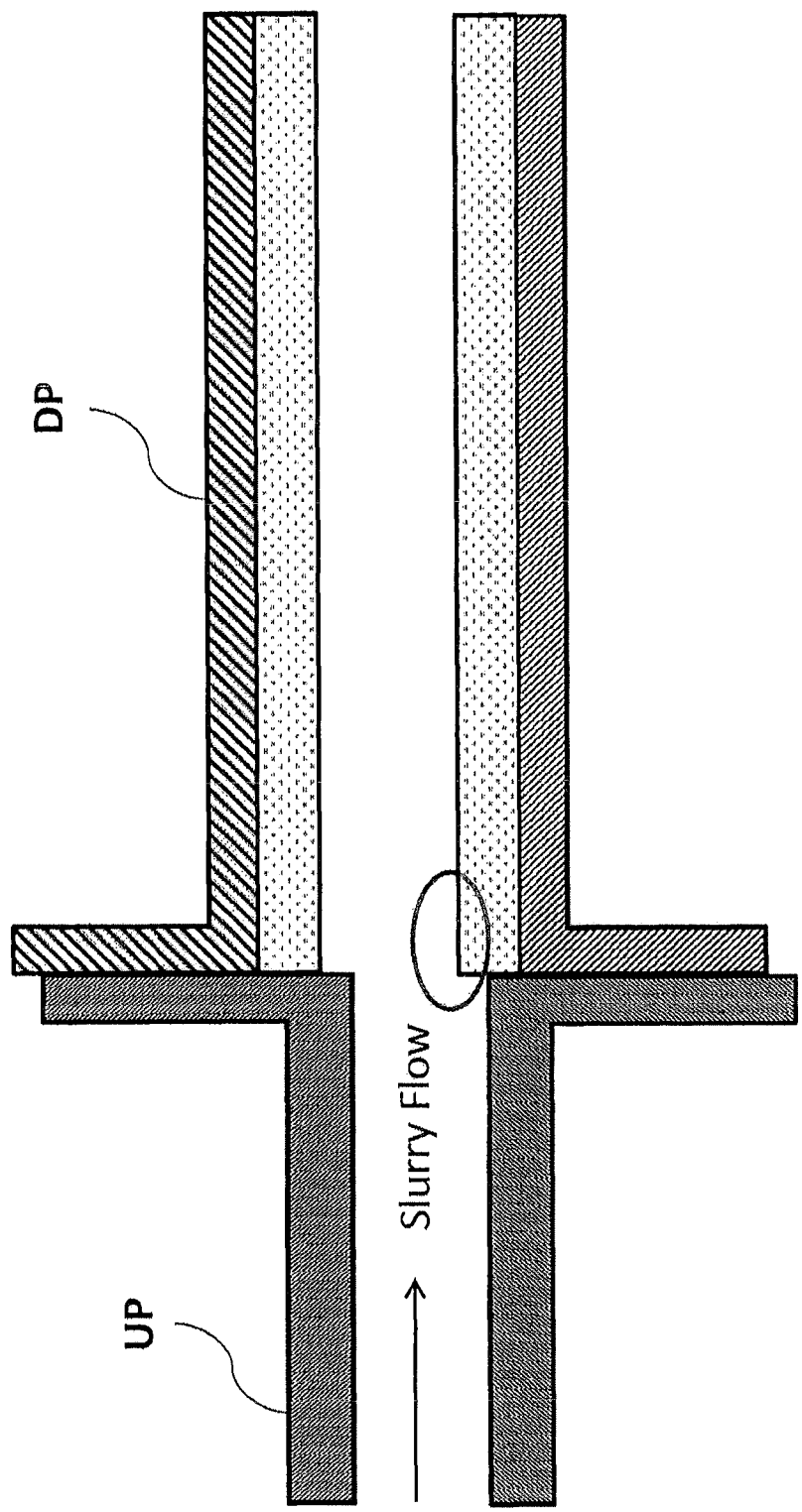
FIGS. 1A and 1B are cross-sectional views of prior art pipes assembled with an adjacent pipe or fitting, or a transition ring.
Figure 1B:
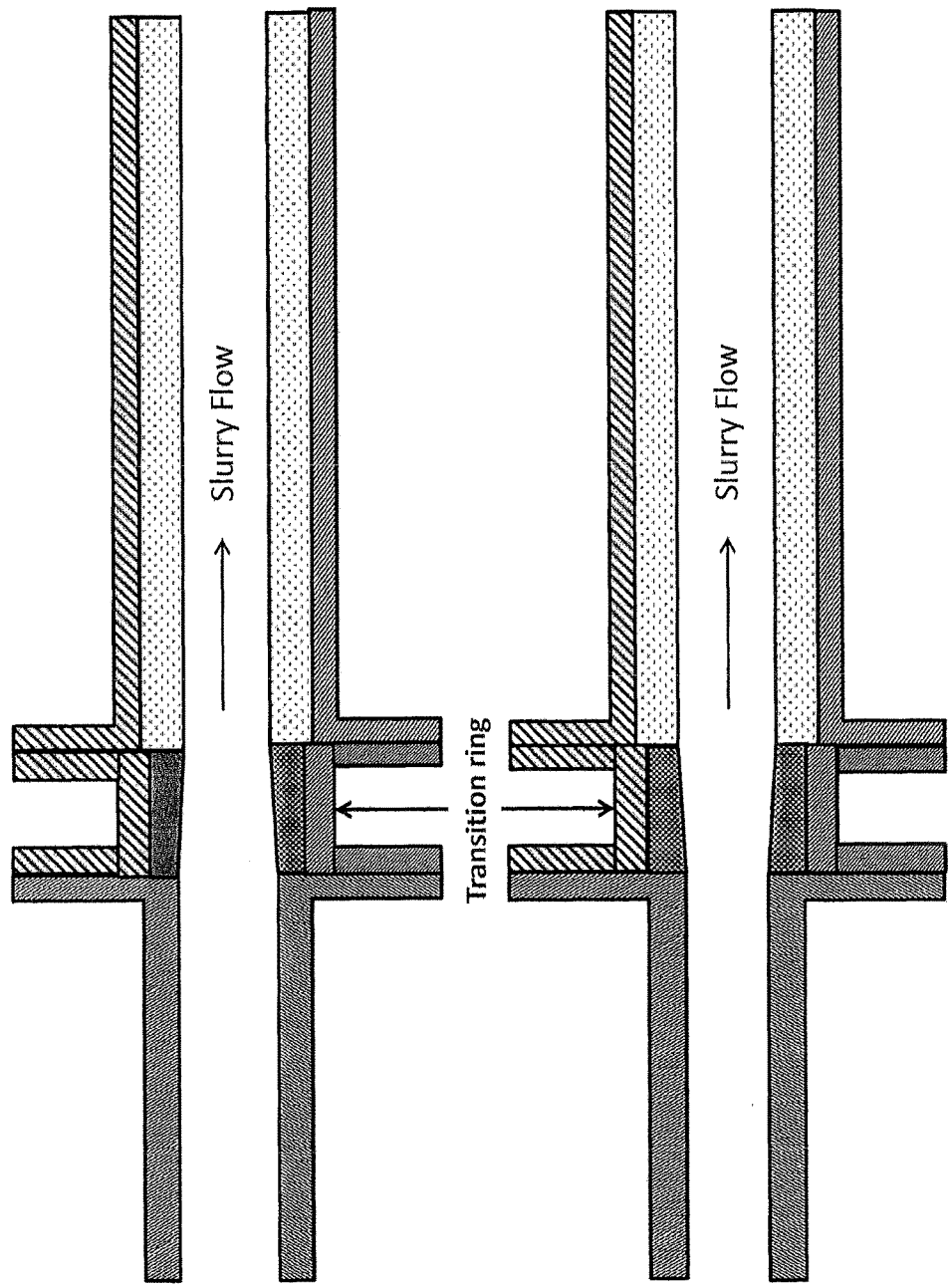

This invention relates to polymer-lined pipes and fittings with replaceable inlet/outlet components (10). The replaceable component (10) comprises an outer ring or sleeve (12) and an inner polymer liner (14).

The outer ring (12) is preferably a metal ring, such as steel, but may be made from any suitable rigid material which can provide structural integrity to support the replaceable component in place. The outer ring may be made of a non-metallic material such as fiberglass reinforced plastic.

The polymer liner (L) of the parent (P) pipe or fitting, and the polymer liner (14) of the replaceable component, may comprise any polymer suitable for lining pipes used for mining slurry transport, and are well known in the art. Especially, elastomers have demonstrated excellent wear performance in many slurry applications. An elastomer is a polymer having the property of elasticity, whereby the polymer deforms in response to the application of stress, and substantially recovers its original form when the stress is removed. Elastomers typically have a low Young's modulus and a high yield strain, as is well known in the art. Suitable elastomers include, without limitation, natural or synthetic rubbers, polyurethanes, thermoplastic polymers, and other thermoset polymers. Polymer liner can have fillers such as carbon black, Kevlar fibers or nano-fillers for higher wear and tear resistance, as is well known in the art.

It is preferable for the polymer liner (14) of the replaceable component to be the same or similar material as the polymer liner (L) of the pipe (P) or fitting it is installed into, to mitigate uneven wear performance throughout the pipe. In one embodiment, the polymer liner (14) is fully bonded onto the outer ring (12) such as through a molding, casting or vulcanizing process.

Figure 2:
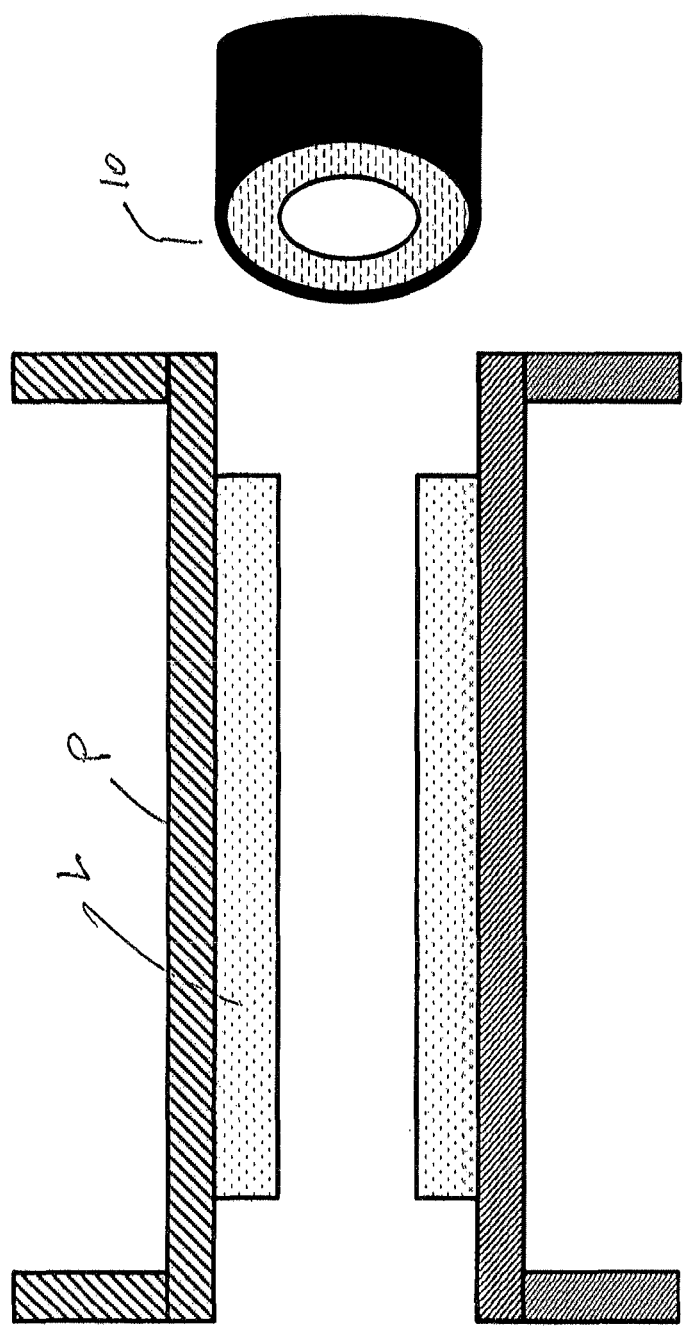
FIG. 2 is a longitudinal cross-sectional view of one embodiment of a pipe, with perspective views of replaceable components at both ends of the pipe.

The inlet and/or the outlet of the polymer-lined pipe or fitting is configured to receive the replaceable components as shown in FIG. 2. Essentially, the metallic shell of the pipe (P) extends beyond the polymer liner (L) by a distance substantially equal to the length of the replaceable component. In one embodiment, the outer diameter of the outer ring (12) should closely match the inside diameter of the pipe (P) in the groove, while the inside diameter of the polymer liner (14) of the replaceable components should closely match the inside diameter of the polymer liner (L) of the pipe (P).

Figure 3:
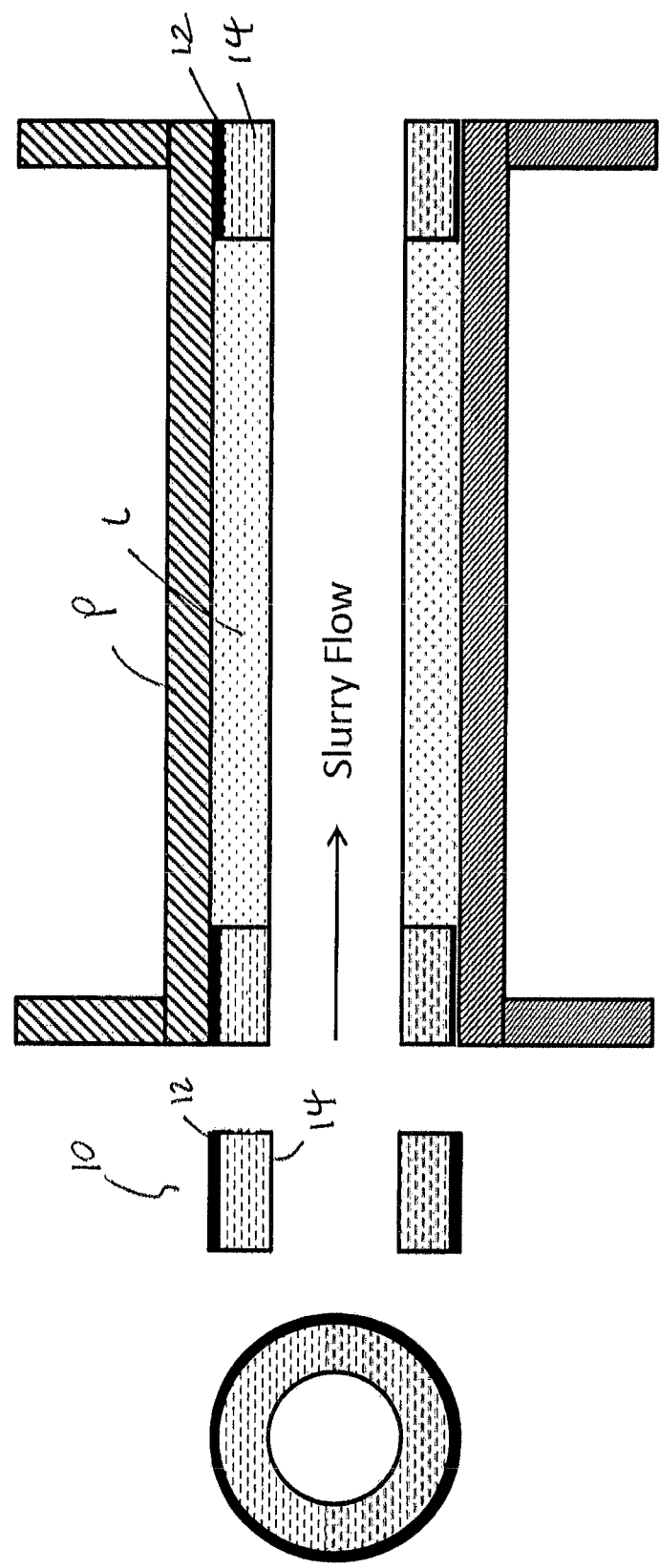
FIG. 3 is a longitudinal cross-sectional view of the embodiment shown in FIG. 2, showing the replaceable components with a square cut end.
Figure 4:
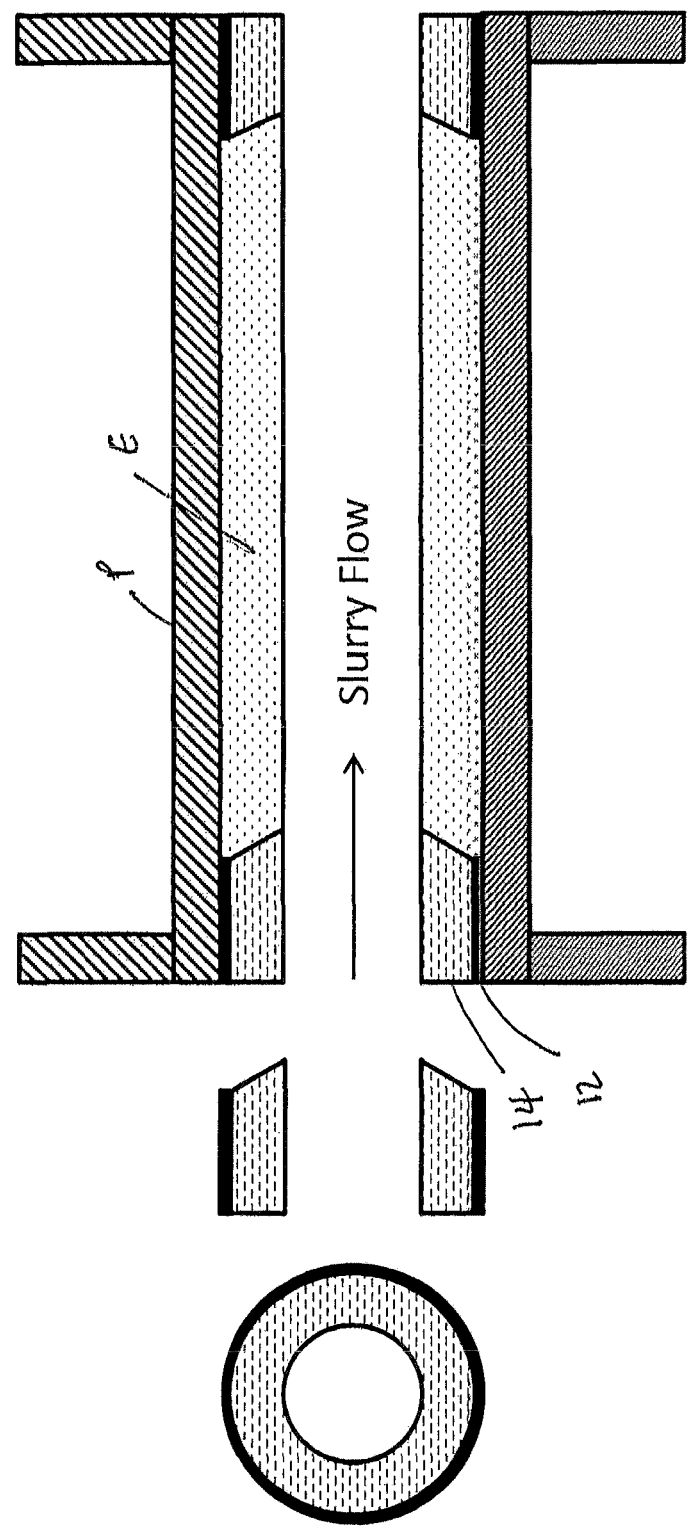
FIG. 4 is a longitudinal cross-sectional view of the embodiment shown in FIG. 2, showing the replaceable components with an angle cut end.

The end of the replaceable components can be square-cut as shown in FIG. 3 or angle-cut to make the mating interface between the replaceable component and the parent pipe away from the direction of the incoming slurry stream, as shown in FIG. 4.

Figure 5:
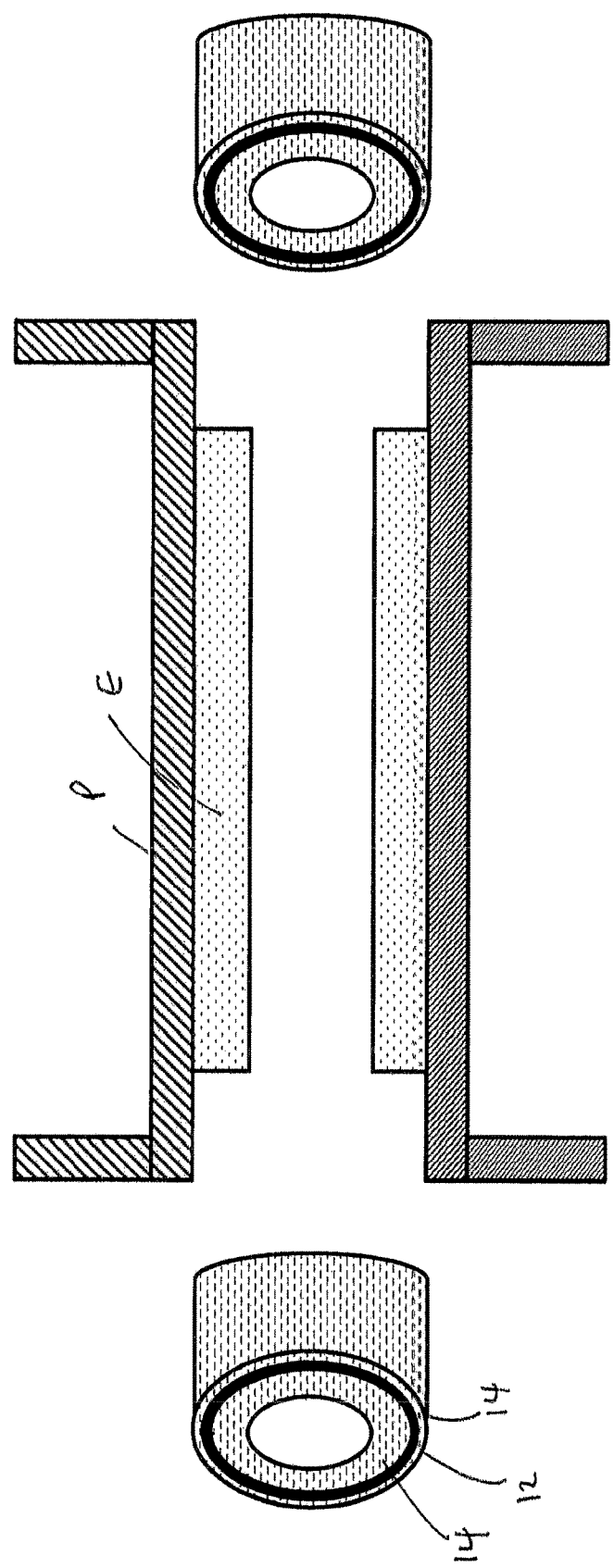
FIG. 5 is a longitudinal cross-sectional view of an alternative embodiment of FIG. 2, showing outer ring of the replaceable components is lined, coated, or encapsulated for corrosion protection.

In one embodiment, the outer ring (12) can be encapsulated by the polymer liner (14) to prevent any possible corrosion on the metallic component (FIG. 5). Alternatively, the exposed metallic surfaces in the replaceable components can be separately lined or coated. The exposed metallic surfaces of the parent pipe (P) in the groove can be lined or coated to prevent possible corrosion on the parent pipe. The replaceable components (10) can be glued to the pipe (P) or fitting for additional stability. The adhesive should have sufficient strength to provide proper stability during operation, however still allow separation when required for replacement. Sealing agents compatible with the polymer liner (L, 14), such as those found in field repair kits may also be used to fill any gaps, seams, and rough surface profiles to achieve smooth bore.

Figure 6:
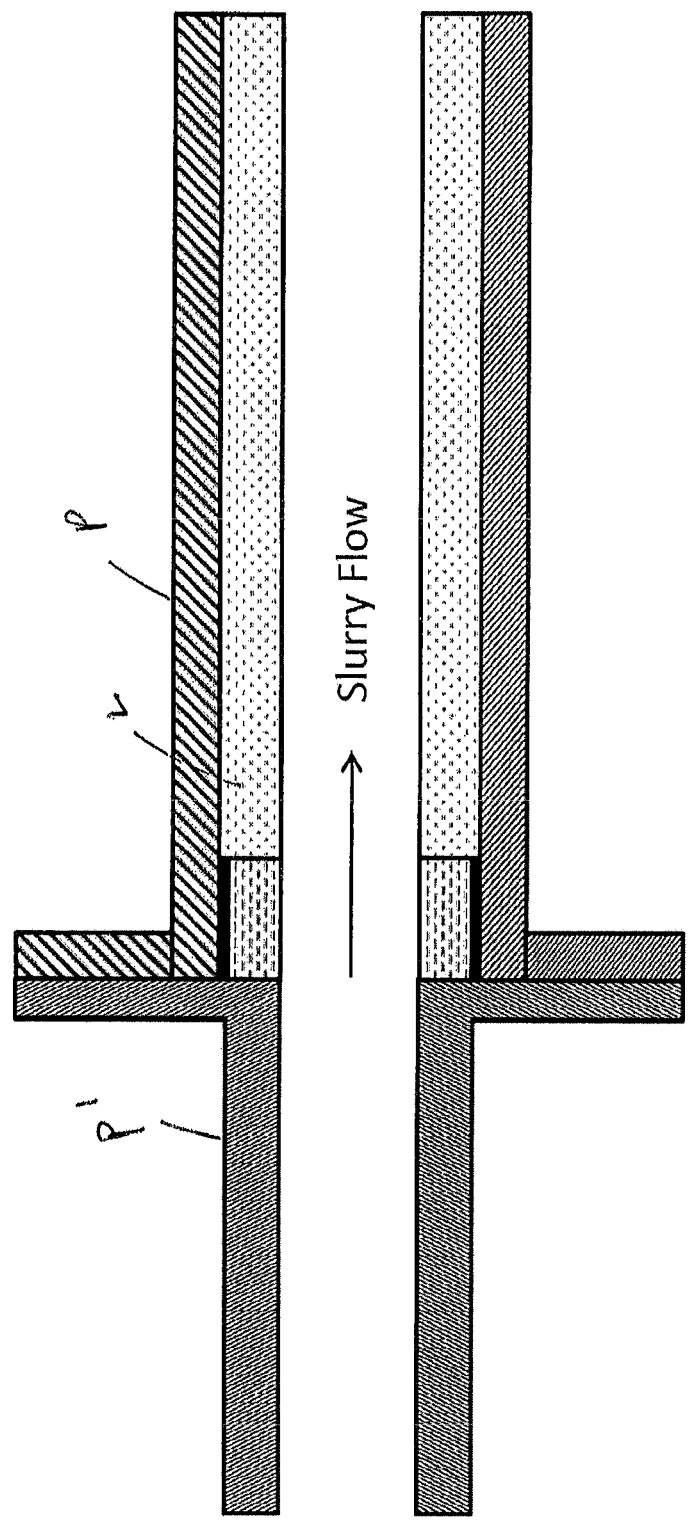
FIG. 6 is a longitudinal cross-sectional view of pipe connection, showing the replaceable component being interlocked between parent and mating pipes.
Figure 7:
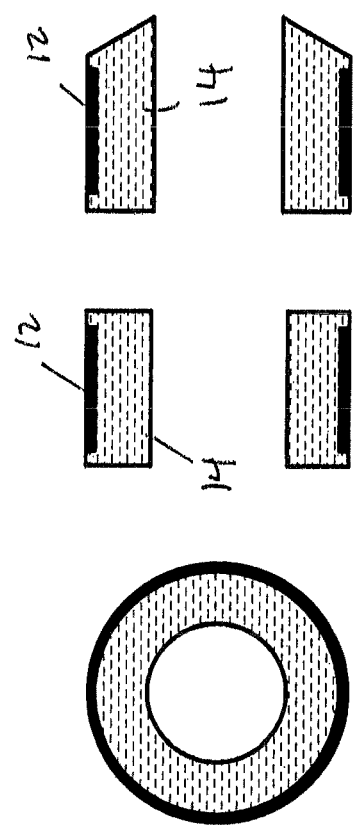
FIG. 7 is a cross-sectional view of replaceable components, showing the polymer liner protruding beyond two ends of the outer ring. When interlocked between parent and mating pipes, the protruded polymer is compressed to make compression fit.

The replaceable component (10) can be interlocked between the parent pipe (P) and a mating pipe (P'), as shown in FIG. 6. A tight seal between pipes (P, P') may be achieved with tight tolerance control and a compression-fit design. For example, the polymer liner (14) in the replaceable components (10) may be slightly oversized in the axial direction, so as for polymer liner to protrude slightly beyond two ends of the outer ring (FIG. 7). Thus, when interlocked between parent and mating pipes, the protruded polymer can be compressed to make compression fit.

Figure 8:
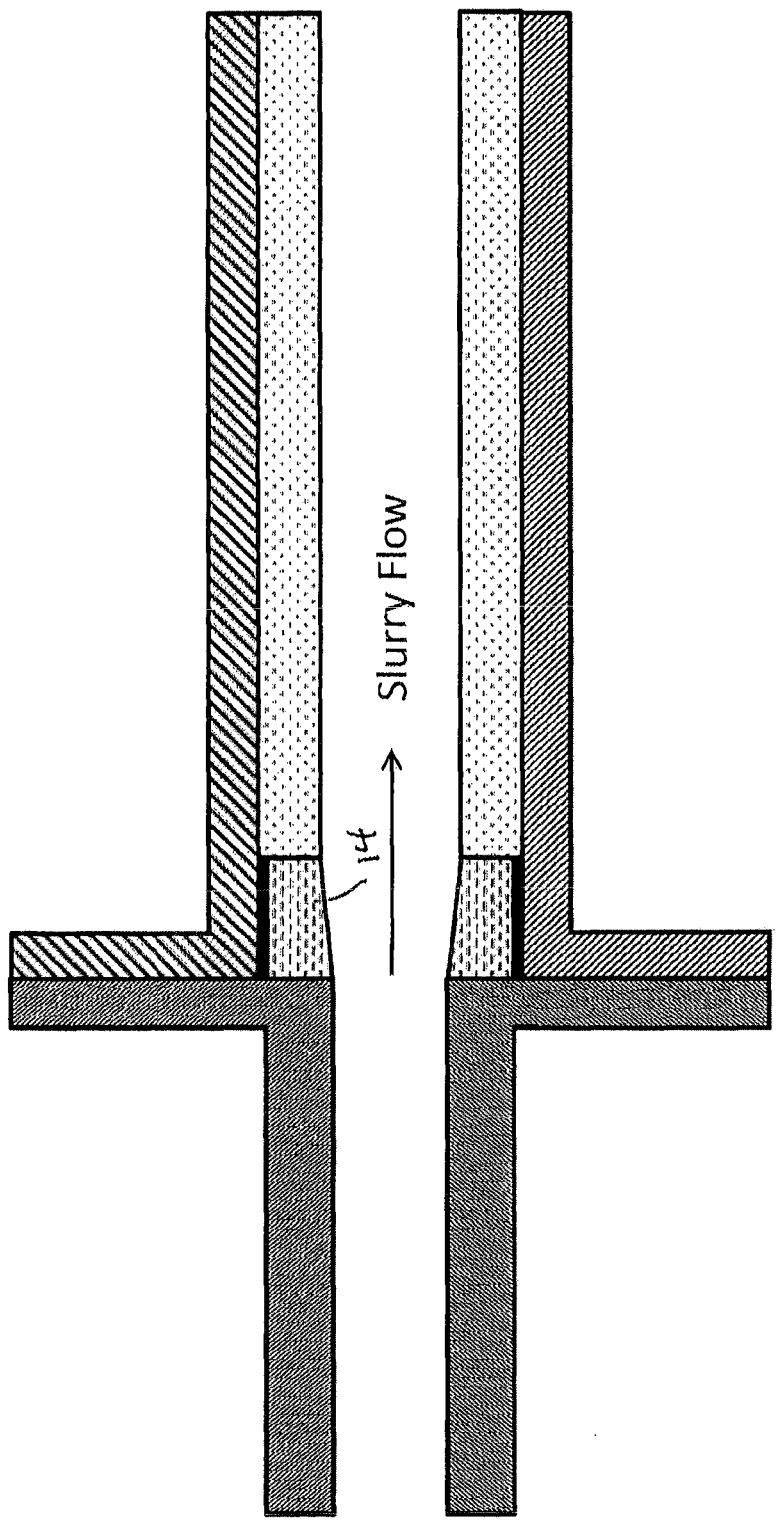
FIG. 8 is a longitudinal cross-sectional view of pipe connection, showing replaceable components with tapered liner to achieve smooth ID transition.
Figure 9:
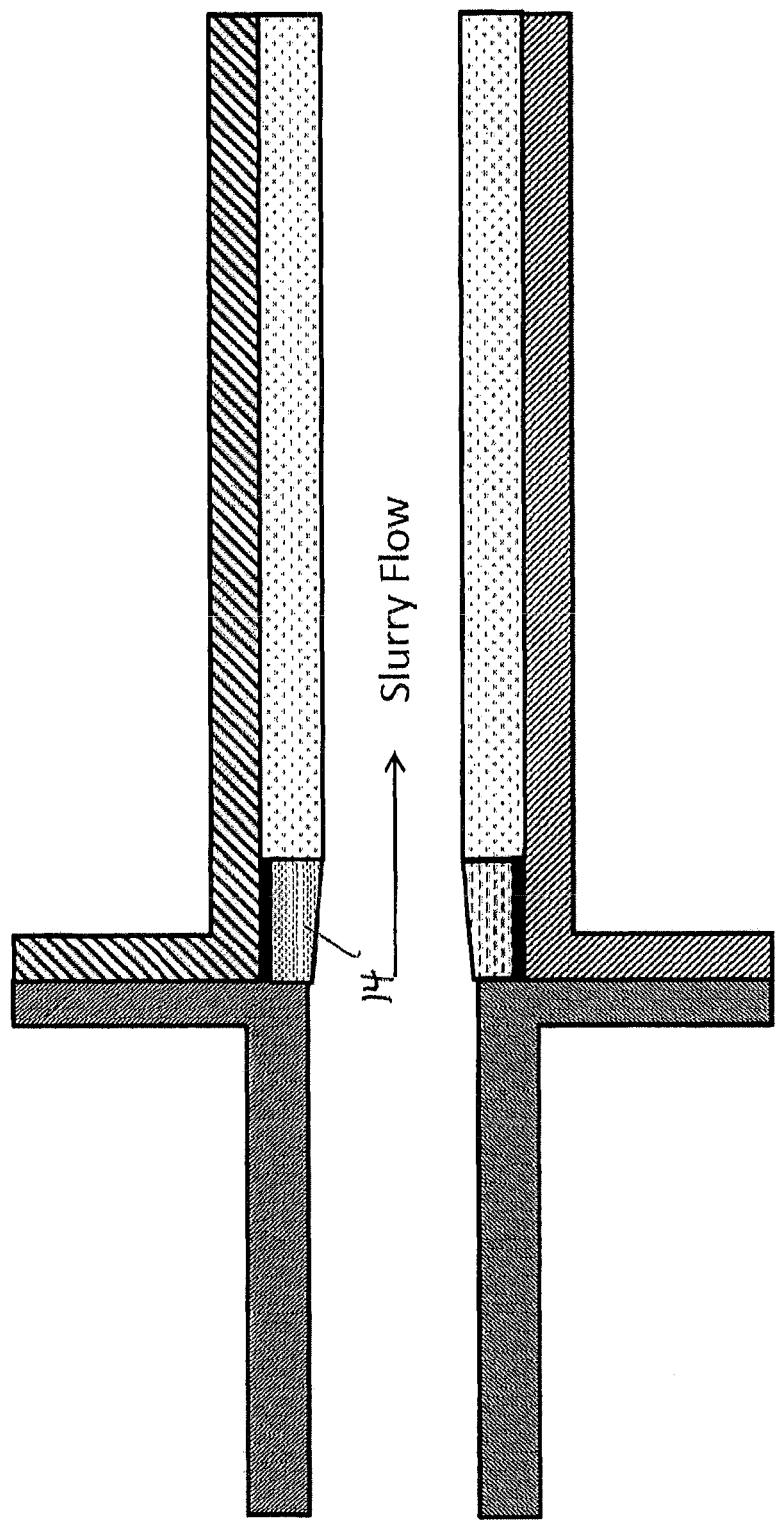
FIG. 9 is a longitudinal cross-sectional view of pipe connection, showing replaceable components with tapered liner to achieve smooth ID transition.

The polymer-lined pipes and fittings with replaceable inlet/outlet components of this invention disclosure can be used as an alternative to transition rings to accommodate mating between pipes with different inside diameters. The polymer liner (14) in the replaceable component (10) may be tapered with increasing diameter (FIG. 8) or decreasing diameter (FIG. 9) so as to form a conically shaped inner bore. In each case, the smooth transition in inside diameter can be achieved at the pipe connection. The polymer liner (14) may be tapered by molding or casting in the desired shape, or by machining flat-faced liner.

Figure 10:
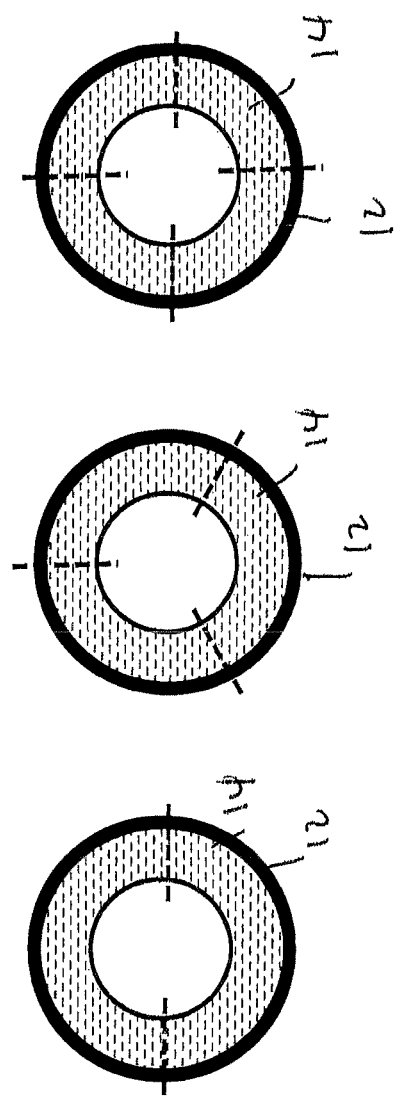
FIG. 10 shows cross-sectional views of a replaceable component, each showing a replaceable component assembled from multiple sections.

For easy rotation or replacement, the replaceable components can be sectioned into multiple pieces (i.e. two, three or four pieces) as shown by the dashed lines in FIG. 10.

Figure 11:
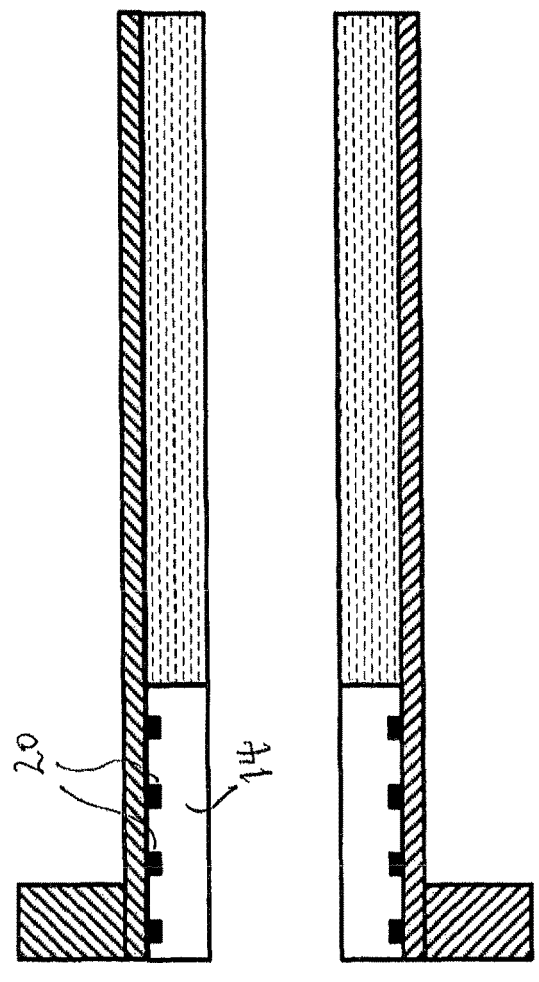
FIG. 11 shows a longitudinal cross-sectional view of an alternative embodiment, where the outer ring comprises a plurality of narrow rings, gapped with the polymer liner.

In an alternative embodiment, the replaceable component may comprise two or more outer rings (20), which may be of narrower width than if a single outer ring is used. As shown in FIG. 11, the multiple rings (20) may be uniformly spaced, with the polymer liner (14) disposed in the gaps between adjacent rings. In another embodiment, the replaceable component may comprise an outer ring which is a spirally wound ring, leading to increased flexibility of the replaceable ring and the resultant benefits in assembly/disassembly during installation.

Figure 12:
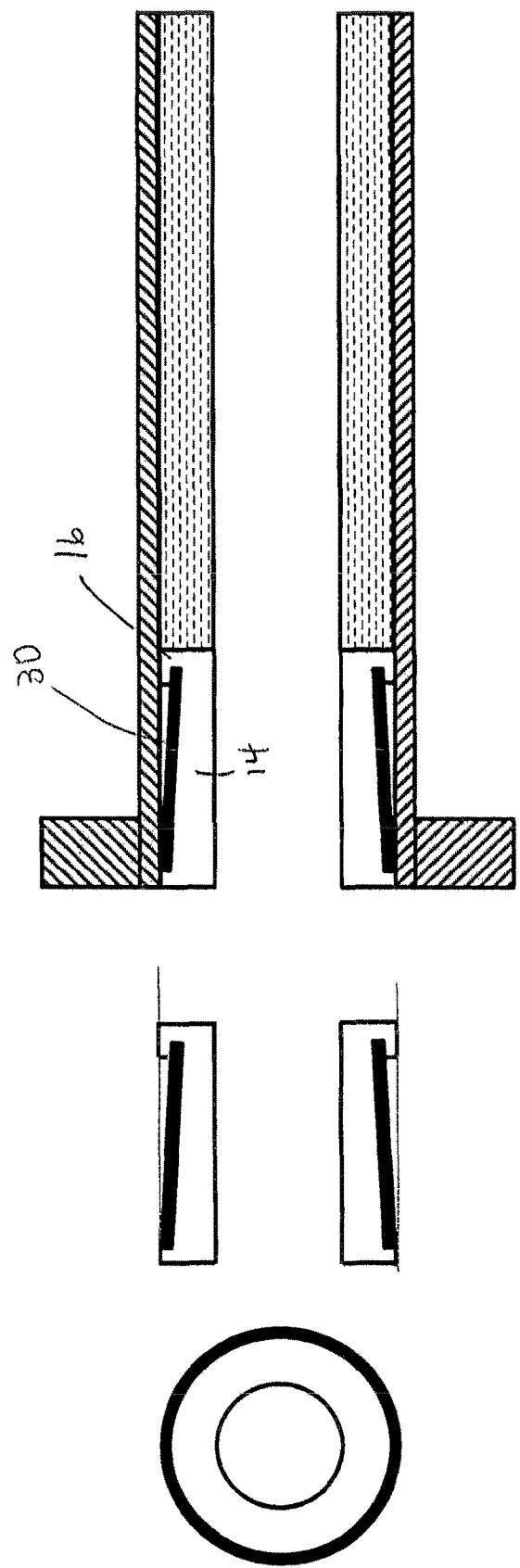
FIG. 12 shows a longitudinal cross-sectional view of an alternative embodiment, where the outer ring is tapered to reduce surface area contact with the pipe.
Figure 13:
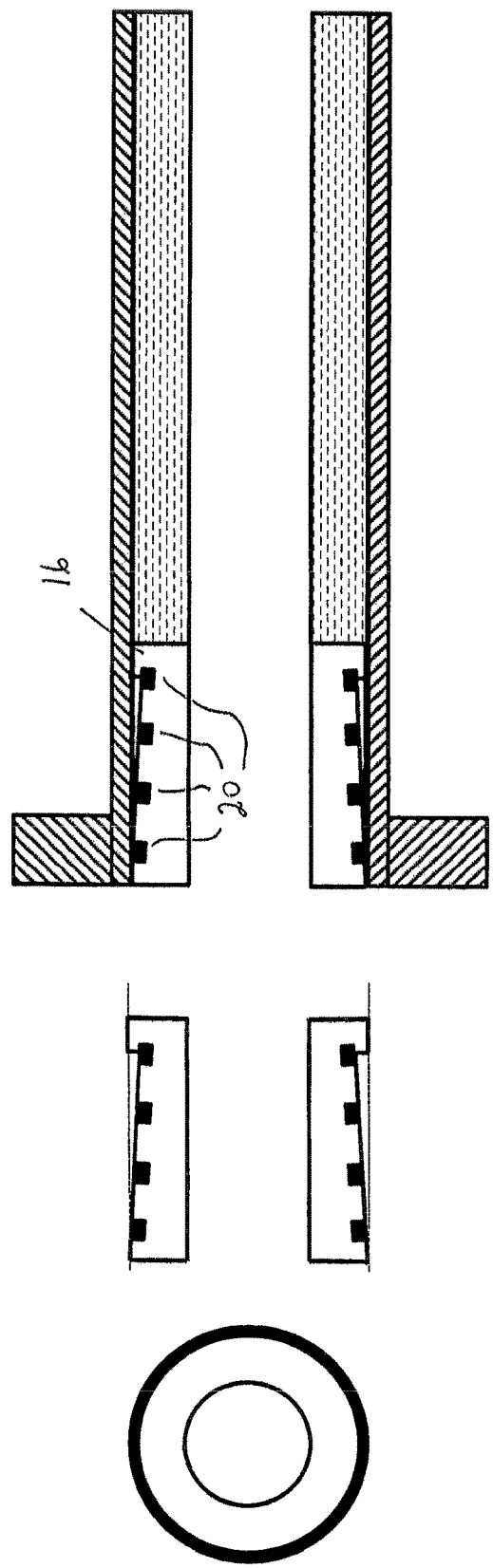
FIG. 13 shows a longitudinal cross-sectional view of an alternative embodiment, where the outer ring comprises a plurality of narrow rings, gapped with the polymer liner, and having smaller diameters.

In another alternative embodiment, as shown in FIG. 12, the outer ring (30) may be elongated and have a slight taper, to have a smaller diameter at one end. As a result, the outer ring may have the shape of a portion of a truncated cone. The polymer liner (14) may wrap around the reduced diameter end, to form a lip (16) which seals against the inside of the pipe (P). This configuration reduces the contact area between replaceable component (10) and the pipe (P), which may make insertion and removal more convenient. In another variation, as shown in FIG. 13, two or more outer rings (20) with a slightly diminishing diameter may be provided, which also has the effect of reducing contact area between the replaceable component (10) and the pipe.

Figure 14:
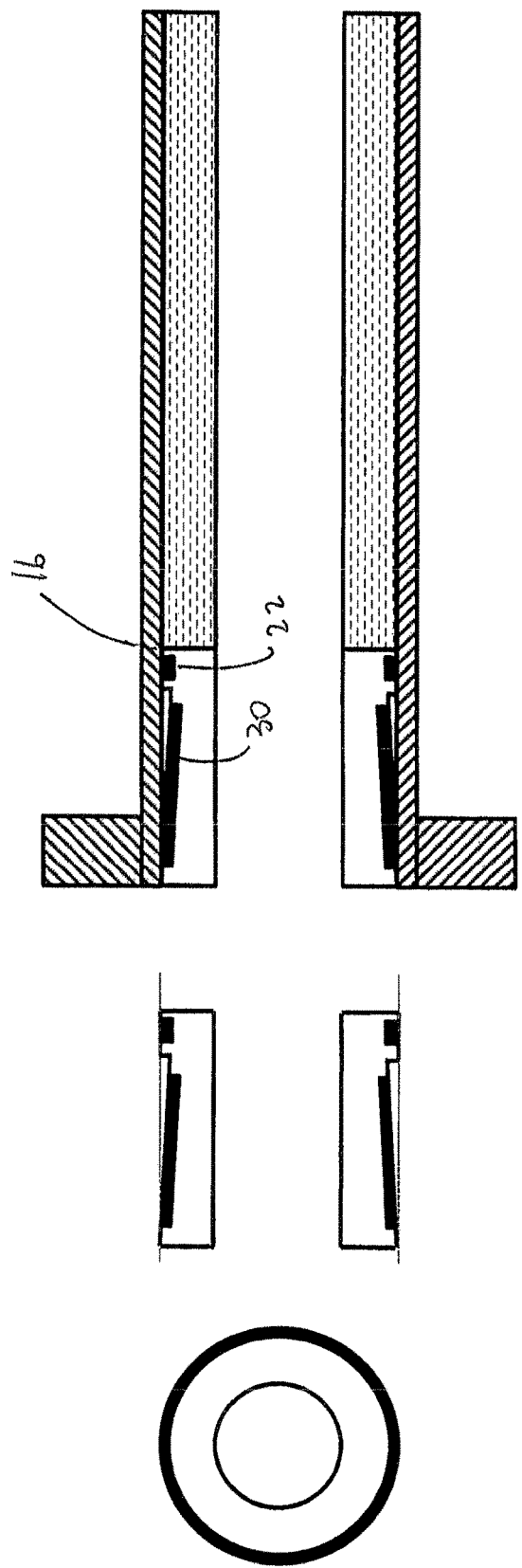
FIG. 14 shows a longitudinal cross-sectional view of an alternative embodiment, where the outer ring is tapered, and an end ring.

In a further alternative example, as shown in FIG. 14, a combination of a truncated cone ring (30) together with a single end ring (22) disposed within the lip (16) may provide the combination of easy installation or removal, and enhanced structural integrity.

In yet another alternative, a combination of multiple rings (20) with slightly diminishing diameters, and an end ring (22) disposed within the lip may be used, as shown in FIG. 15.

Once the replaceable component has serious liner wear on the bottom, only the replaceable component can be rotated.

This can bring significant benefits in maintenance compared to rotating the entire pipe or fitting. Once the replaceable component is seriously worn out around the circumference, only the replaceable component can be replaced. This can bring significant benefits in maintenance compared to replacing the entire pipe or fitting. This is similar to replacing ink cartridge in printers, not requiring significant time, environmental control, and skillsets as being required for repair kits.

It is believed by using the replaceable inlet/outlet components (10) described herein, the lifecycle of the polymer-lined pipes or fittings can be extended. Also, it is hoped that by using the replaceable components with a tapered liner, significant cost benefit can be achieved by avoiding use of expensive transition rings.

Definitions and Interpretation

The singular forms "a," "an," and "the" include plural reference unless the context clearly dictates otherwise. It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The term "and/or" means any one of the items, any combination of the items, or all of the items with which this term is associated. The phrase "one or more" is readily understood by one of skill in the art, particularly when read in context of its usage.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range of values includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, as used in an explicit negative limitation.

As will be apparent to those skilled in the art, various modifications, adaptations and variations of the foregoing specific disclosure can be made without departing from the scope of the invention claimed herein. The various features and elements of the invention described herein may be combined in a manner different than the specific examples described or claimed herein without departing from the scope of the invention. In other words, any element or feature may be combined with any other element or feature in different embodiments, unless there is an obvious or inherent incompatibility between the two, or it is specifically excluded.

What is claimed is:

1. A polymer-lined pipe or fitting having an end configured to receive a replaceable component to form a continuous bore, the end comprising a mechanical coupling for attaching and detaching another pipe or fitting, the replaceable component comprising:
   (a) an outer ring having at least a portion having an outside diameter matching an inside diameter of the pipe or fitting, wherein the outer ring comprises two or more rings, separated by the polymer liner; and
   (b) a polymer liner bonded to or encapsulating the outer ring and having an inside diameter matching the inside diameter of the polymer liner of the pipe or fitting.

2. The pipe or fitting of claim 1 wherein a first ring has an outside diameter matching the inside diameter of the pipe or fitting and a second ring has a smaller diameter which does not contact an inside surface of the pipe or fitting.

3. The pipe or fitting of claim 1 wherein the polymer liner forms a lip at the second end, where the lip is in contact with the inside surface of the pipe.

4. The pipe or fitting of claim 3 wherein an end ring is embedded inside the lip.

5. A polymer-lined pipe or fitting having an end configured to receive a replaceable component to form a continuous bore, the end comprising a mechanical coupling for attaching and detaching another pipe or fitting, the replaceable component comprising:
   (a) an outer ring having at least a portion having an outside diameter matching an inside diameter of the pipe or fitting, wherein the outer ring is elongated and tapered to be a portion of a truncated cone, wherein a first end of the outer ring contacts an inside surface of the pipe and a second end does not; and
   (b) a polymer liner bonded to or encapsulating the outer ring and having an inside diameter matching the inside diameter of the polymer liner of the pipe or fitting.

* * * * *

UNITED STATES PATENT AND TRADEMARK OFFICE
CERTIFICATE OF CORRECTION

PATENT NO. : 10,139,019 B2
APPLICATION NO. : 15/581939
DATED : November 27, 2018
INVENTOR(S) : Soon Won Moon, Stefano Chiovelli and Shane D. Ryan It is certified that error appears in the above-identified patent and that said Letters Patent is hereby corrected as shown below:

On the Title Page

Item (73) Assignee reads "SYNCRUDE CANADA LTD., Port McMurray (CA), in trust for the owners of the Syncrude Project as such owners exist now and in the future". It should read "SYNCRUDE CANADA LTD., Fort McMurray (CA), in trust for the owners of the Syncrude Project as such owners exist now and in the future."

Signed and Sealed this
Fifth Day of March, 2019

Andrei Iancu
*Director of the United States Patent and Trademark Office*